(12) United States Patent
Kim et al.

(10) Patent No.: US 10,294,374 B2
(45) Date of Patent: May 21, 2019

(54) COMPOSITION OF HIGH TEMPERATURE RESISTENT POWDER COATING, A PREPARATION METHOD THEREFORE, AND USE THEREOF

(71) Applicant: AKZO NOBEL COATINGS INTERNATIONAL B.V., Arnhem (NL)

(72) Inventors: Suje Kim, Zhejiang (CN); Jian Tong, Zhejiang (CN)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 14/897,440

(22) PCT Filed: Jun. 16, 2014

(86) PCT No.: PCT/EP2014/062494
§ 371 (c)(1),
(2) Date: Dec. 10, 2015

(87) PCT Pub. No.: WO2014/202495
PCT Pub. Date: Dec. 24, 2014

(65) Prior Publication Data
US 2016/0108251 A1 Apr. 21, 2016

(30) Foreign Application Priority Data

Jun. 19, 2013 (WO) ............... PCT/CN2013/077474
Sep. 23, 2013 (EP) .................................... 13185504

(51) Int. Cl.
| | |
|---|---|
| C09D 5/03 | (2006.01) |
| C09D 7/65 | (2018.01) |
| C09D 183/04 | (2006.01) |
| C09D 183/06 | (2006.01) |
| C09D 7/40 | (2018.01) |
| C08K 3/34 | (2006.01) |
| B05D 5/08 | (2006.01) |
| C08K 3/013 | (2018.01) |

(52) U.S. Cl.
CPC ............... *C09D 5/038* (2013.01); *C09D 5/03* (2013.01); *C09D 5/033* (2013.01); *C09D 7/40* (2018.01); *C09D 7/65* (2018.01); *C09D 183/04* (2013.01); *C09D 183/06* (2013.01); *B05D 5/08* (2013.01); *C08G 2150/20* (2013.01); *C08K 3/013* (2018.01); *C08K 3/346* (2013.01)

(58) Field of Classification Search
CPC ....................................................... C09D 5/03
See application file for complete search history.

(56) References Cited

U.S. PATENT DOCUMENTS

| | | | | |
|---|---|---|---|---|
| 5,905,104 A | * | 5/1999 | Eklund | .................... B05D 1/06 106/287.12 |
| 6,248,824 B1 | * | 6/2001 | Decker | ................ C09D 183/04 106/600 |
| 2004/0210019 A1 | * | 10/2004 | Hasegawa | ................ C08F 8/42 526/279 |
| 2004/0241443 A1 | | 12/2004 | Decker et al. | |
| 2009/0203837 A1 | * | 8/2009 | Morita | ............... C08G 59/3254 524/588 |

FOREIGN PATENT DOCUMENTS

| | | |
|---|---|---|
| EP | 0 950 695 A1 | 10/1999 |
| EP | 0950695 A1 | 10/1999 |
| RU | 2 333 926 C2 | 1/2006 |
| RU | 2333926 C2 | 9/2008 |
| WO | 2004076572 A1 | 9/2004 |
| WO | WO 2009003937 A1 * | 1/2009 ............... C09D 5/03 |

OTHER PUBLICATIONS

Talik, Progress in Organic Coatings, vol. 13, pp. 333-345, 1985.
Organic Coatings: Science and Technology (Wicks et al., eds., 3rd Ed., Wiley-Interscience, 2007), pp. 160-166.

\* cited by examiner

*Primary Examiner* — Megan McCulley
(74) *Attorney, Agent, or Firm* — McDonnell Boehnen Hulbert & Berghoff LLP

(57) ABSTRACT

The present invention provides for a composition of high temperature resistant powder coating which comprises at least two silicone resins having different glass transition temperatures and/or different melt viscosities, a bi-functional resin, a mica-containing filler and optional additives. When applied to a substrate, the composition is capable of curing to form a high temperature resistant coating on the substrate surface. The present invention also provides for use of the composition of the present invention to coat a substrate, as well as substrates coated with the composition of the present invention.

16 Claims, No Drawings

COMPOSITION OF HIGH TEMPERATURE RESISTENT POWDER COATING, A PREPARATION METHOD THEREFORE, AND USE THEREOF

REFERENCE TO RELATED APPLICATIONS

This application is the U.S. National Phase of PCT/EP2014/062494, filed on Jun. 16, 2014, which is incorporated herein by reference it its entirety, and which claims the benefit of International Application No. PCT/CN2013/077474, filed Jun. 19, 2013, and EP Application No. 13185504.1, filed on Sep. 23, 2013.

TECHNICAL FIELD

This invention relates to a composition of high temperature resistant powder coating that may be cured on a substrate to produce a high temperature resistant coating. It further relates to a method for preparing the composition, and to the use of the composition.

BACKGROUND

It is obviously desirable for coatings that are to be applied to ovens, boilers, heat exchangers, automotive parts, cooking elements, cooking utensils and the like to exhibit high temperature resistance. Most organic coatings are unsuitable for such applications as they tend to be rapidly consumed when exposed to air at temperatures greater than 550° C. This consequence lead to the development of coatings and paints that incorporated polysiloxane resins, as described in U.S. Pat. No. 5,905,104 (Eklund et al.). In the examples a mixture of siloxane resins is mentioned, viz. a mixture of Dow Corning 1-0543 and Dow Corning Z-6018. These resins have the following properties:

Dow Corning 1-0543 (now DC 220) $T_g$=49° C., viscosity at 140° C. of 9.8 poise;

Dow Corning Z-6018 $T_g$=48° C., viscosity at 140° C. of 14.1 poise.

Despite showing improved temperature resistance, coatings containing polysiloxane resins were still found to exhibit deleterious effects at the high temperatures. When polysiloxane powder coated materials are exposed to temperatures greater than 550° C., the coatings suffered loss of their constituent organic components through oxidation; the polysiloxane resin consequently shrinks rapidly which builds up stresses within the coatings. Such stresses are relieved by cracking causing the coating to peel or flake from the material.

WO2004/076572 (Dupont de Nemours and Company) purports to resolve this problem by including within the polysiloxane resin at least one matrix material, preferably low melting inorganic glass, that softens and exhibit some flow in the temperature range in which the polysiloxane resin undergoes shrinkage and embrittlement.

European Patent No. 0950695 B1 (Morton) proposes an alternative solution in which the powder coating composition consists of a single silicone resin combined with titania and a filler of mica platelets and/or calcium metasilicate particles. The single silicone resin is characterized by having siloxane functionality (Si—O—H) and only minor amounts of organic moieties. It is preferred in this citation that the single polysiloxane has a degree of substitution of less than 1.5 and an —OH content of between 2.0 and 7.5 wt. % based on the weight of said polysiloxane. The limitation of the —OH content reduces the evolution of water when the polysiloxane self-cures at temperatures between 150° and 260° C. and thus reduces the formation of defects, such as pinholes, in the coating that are caused by said water escaping. However, it is noted this powder coating composition may only be applied to substrates at a dry film thickness in the range from 1.8 to 2.2 mils (45 to 55 µm).

WO 2009/003937 (Akzo Nobel Coatings International B.V.) discloses a powder coating composition which comprises a resin component and a filler, wherein the resin component comprises a first silicone resin and a second silicone resin having glass transition temperatures ($T_g$) that are different by at least 5° C. and/or having melt viscosities, as measured at 140° C., that are different by at least 5, preferably 10 poise. With respect to the filler component of the composition, it is preferred that the filler is a heat resistant material with one dimension at least four times larger than the other, said filler being present in an amount between 5 and 95 wt. % based on the weight of the resin component. It was found that these compositions are not able to withstand prolonged exposure to high temperatures (~550° C.) when applied to substrates with a high surface roughness, i.e. substrates that have a surface that is profiled or uneven.

When powder coatings are applied to automotive bodies in order to protect and finish the engineered product, the substrates tend to be relatively thin and to have smooth surfaces. However, in the application of coatings to materials that are required to show high temperature resistance, it is more common for the substrate surfaces to be profiled or uneven: to provide adequate corrosion protection and an (aesthetic) finish to blast cleaned steel, for example, the substrate must be coated at a sufficient dry film thickness to compensate for surface unevenness. Blasting substrates with angular grit, rounded shot, abrasive loaded sponges or high pressure water jets can typically yield profiled surfaces that can exhibit "valley to peak" distances of between 10 and 80 µm (wherein said profiles may be defined by ISO 8503).

For such uneven substrates, there is found to be a practical upper limit to the dry film thickness (DFT) of the powder coating, beyond which the coating will crack and peel from the substrate. Obviously, the lower that limit, the lower the capacity of a given powder coating to compensate for enhanced blast profiles of a substrate surface.

There consequently exists a need in the art to provide a powder coating composition that shows high temperature resistance but which also may be applied to profiled substrate surfaces to provide temperature resistance and preferably corrosion resistance to said surfaces.

DESCRIPTION OF THE INVENTION

The present invention provides for a composition of high temperature resistant powder coating which is non-hazardous and non-polluting. When applied to a substrate, in particular a profiled substrate, the composition is capable of curing to form a high temperature resistant coating on the substrate surface. The present invention also provides for use of the composition of the present invention to coat a substrate, as well as substrates coated with the composition of the present invention.

In one aspect of the present invention, a composition of high temperature resistant powder coating is provided. The present invention developed a series of high temperature resistant powder coatings based on a composition mainly comprising at least two silicone resins having different glass transition temperatures and/or different melt viscosities, a bi-functional resin, a mica-containing filler, and optional additives.

As used herein, the term "resin" is meant to include any resin or polymer per se, as well as the curing agent. With respect to the silicone resins of this invention, the degree of substitution is herein defined as the average number of substituent organic groups per silicon atom and is the summation of the mole percent multiplied by the number of substituents for each ingredient. This calculation is further described in "Silicones in Protective Coatings", by Lawrence H. Brown (in *Treatise on Coatings* Vol. 1, Part III, "Film-Forming Compositions" pp. 513-563, R. R. Meyers and J. S. Long eds. Marcel Dekker, Inc. New York, 1972).

As used herein, the "glass transition temperature" or $T_g$ of any polymer may be calculated as described by Fox in *Bull. Amer. Physics. Soc.*, 1, 3, page 123 (1956). The $T_g$ can also be measured experimentally using differential scanning calorimetry (at a rate of heating 20° C. per minute, wherein the $T_g$ is taken at the midpoint of the inflection). Unless otherwise indicated, the stated $T_g$ as used herein refers to the calculated $T_g$.

Without being bounded by theory, differences in the glass transition temperatures and/or melt viscosity of the at least two silicone resins can arise as a consequence of differences in the degree of branching of the polymers. In general, the more highly branched the polymer, the greater the shrinkage observed at high temperatures. Furthermore, the at least two silicone polymers may be distinguished on the basis of their type and amount of constituent organic moieties and their —OH content (i.e. the degree of siloxane functionality). Detailed discussion as to powder coatings comprising different silicon resins and the performance of resulting coatings can be found in WO 2009/003937.

The different silicone resins suitable for use in the composition of the present invention may have glass transition temperatures ($T_g$) that are different with one another by at least 5° C., and/or have melt viscosities, as measured at 140° C., that are different with one another by at least 5 poise, preferably 10 poise. The different thermal properties of the silicone resins in the powder coating composition results means that, individually, each resin would exhibit different flow behavior at temperatures greater than 550° C. However, these different behaviors synergistically combine to limit shrinkage and embrittlement of a coating containing both silicone resins in this temperature range.

According to one of the preferred embodiments of the present invention, the composition contains a first silicone resin and a second silicone resin, the first and second silicone resins present in resin component in a ratio by weight (First Silicone:Second Silicone Resin) of between 2:1 and 1:2. Equally, it is preferred that said first silicone resin has a $T_g$ in the range from 40° C. to 50° C. and said second silicone resin has a $T_g$ in the range from 55° C. to 80° C. The total amount of the first and the second silicone resins is greater than 60 wt. %, and less than 100 wt. %, preferably 70-90 wt. %, and more preferably 80-84 wt. % based on the total weight of all resin components in the powder coating composition. Specifically, the first silicone resin present in the powder coating composition in an amount of 20-60 wt. %, preferably in an amount of 30-50 wt. %, and more preferably 40-45 wt. % based on the weight of the resin component; the second silicone resin present in the powder coating composition in an amount of 20-60 wt. %, preferably in an amount of 30-50 wt. %, and more preferably 40-45 wt. % based on the weight of the resin component.

The first silicone resin suitable for use in the composition of the present invention can be, for example, SILRES® 604 available from Wacker Chemie. This resin has a reactive hydroxyl content of between 3.5 and 7%, a $T_g$ in the range of 55° to 80° C., and a melt viscosity at 140° C. of 1.03 Pa·s, which corresponds to a melt viscosity at 140° C. of 10.3 poise (1 Pa·s~10 poise).

The second silicone resin suitable for use in the composition of the present invention can be, for example, DC-233 available from Dow Corning. This resin has a reactive hydroxyl content of 6%, a $T_g$ of 45° C. and a melt viscosity at 140° C. of 2.13 Pa·s, which corresponds to a melt viscosity at 140° C. of 21.3 poise.

On the basis of the above mentioned combination of different silicon resins, surprisingly, it has been found that the performance of the composition in terms of heat resistance, brittleness, anti-cracking, and anti-peeling/flaking off the substrate was further and greatly enhanced with the addition of a bi-functional resin, a mica-containing filler, and one or more optional additives. Without wishing to be bounded by any existing theory, it is believed that the bi-functional resin with suitable functional groups contribute to increase crosslink density of the composition, and that the mica-containing filler contributes to form and maintain a stable network structure even under a high temperature, and thus protect the resulting coating from cracking and peeling off the substrate.

When used herein, the term "bi-functional resin" means a resin having at least two different functional groups, i.e. groups that can react with other components that are present in the composition. Functional groups include hydroxyl-functional groups, acid-functional groups, amine-functional groups, glycidyl-functional groups, epoxy-functional groups, etc.

According to one embodiment of the present invention, the bi-functionality resin presents in the powder coating composition in an amount of 15-25 wt. % based on the total weight of all resin components in the powder coating composition (or parts per hundred resin by weight (phr)), preferably in an amount of 18-20 wt. % based on the total weight of all resin components in the powder coating composition.

According to one embodiment of the present invention, the bi-functional resin suitable for use in the composition is a bi-functional acrylic resin and more particularly an acrylic resin having glycidyl and hydroxyl functionality. In addition, this acrylic resin may have an epoxide equivalent weight (EEW) of greater than 300. Examples of suitable bi-functional acrylic resins include, but are not limited to Fine Clad® A 241 available from Reichold Inc.

According to one embodiment of the present invention, the mica-containing filler is present in the powder coating composition in an amount of 45-100 wt. % based on the total weight of all resin components in the powder coating composition, preferably in an amount of 55-75 wt. % based on the total weight of all resin components in the powder coating composition.

A mica-containing filler is a material that primarily consists (>99%) of phyllosilicate mineral, e.g. muscovite mineral ($KAl_2(AlSi_3O_{10})(OH)_2$). These minerals have a layered or platy structure. The mica-containing may further improve adhesion of the powder coating composition to substrates, and to reduce salt spray corrosion. An example of a mica-containing filler material suitable for use in the composition of the present invention is silane treated mica, which is commercially available from IMERYS INC under the name MICA SUZORITE 325HK.

According to one embodiment of the present invention, the composition further comprises a reinforcing filler, for example a fiber or flake material which is selected from the group consisting of glass, metal, mineral, calcium metasilicate flakes, aluminium, silicon, magnesium mixed metal oxide, or a combination thereof. The fiber or flake material used as a reinforcing filler is high temperature resistant and in elongated form.

When used herein, the term "high temperature resistant" or "heat resistant" means that the relevant material is capable of withstanding a temperature not less than 550° C. or has a melting point not less than 550° C.; preferably the relevant material is capable of withstanding a temperature not less than 600° C. or has a melting point not less than 600° C.; and more preferably, the relevant material is capable of withstanding a temperature not less than 700° C. or has a melting point not less than 700° C.

When used herein, the term "elongated form" refers to the physical appearance of each piece of the fiber or flake material, wherein each piece of the fiber or flake material is sized differently in three dimensions. Specifically, the ratio of at least one dimension of each piece of the fiber or flake material used as a reinforcing filler to another is within the range of 15-35, preferably within the range of 20-30, and more preferably, the ratio is about 25.

According to one embodiment of the present invention, the fiber or flake material was made of glass having its melting point higher than 700° C., and shaped as needle type, with the ratio of length/diameter being about 25 on average. When added into the composition of the present invention, this type of reinforcing filler was found to exhibit good high temperature resistant performance, and to help form a firm network structure during the high temperature. Accordingly, the resulting coating can hardly crack or peel off from the substrate even under the high temperature.

In order to provide improved adhesion of the powder coating composition to specific substrates, the composition of the present invention may also comprise adhesion promoters in an amount between 0.1 and 5.0 wt. %, preferably between 1.0 and 4.0 wt. %, and more preferably between 2.5 and 3.0 wt. %, based on the total weight of all resin components in the powder coating composition. In this invention it is preferred to use a polymeric adhesion promoter to improve the adhesion between coating and substrate, since it was found to provide the composition with high temperature resistance by increasing bonding powder between inorganic substrate and organic coatings. An example of the adhesion promoters suitable for use in the composition of the present invention is a polymer with ethoxy active groups such as, for example, Adhesion Promoter T70 which is commercially available from Dongguan zhong tian Decorative Materials. One of ordinary skill in the art would understand that other adhesion promoters known in the art may also be used alternatively, which include, but are not limited to adhesion promoters having pendant or free functional or polar groups—such as carboxyl, anhydride, hydroxyl, halogen, cyano, amido or sulphonate groups—or by having an inherent adherent property or by being of relatively small molecular size. Examples of said adhesion promoters include: Primacor® 5990 (available from Dow Chemicals); Surlyn® 1855 and Nucrel® 403 or 410 (available from DuPont); Hyvis 30 (available from BP Chemicals); Lithene N4 6000 (available from Doverstrand Ltd); and, Soarnol D (EVAL resin available from British Trades & Shippers).

In order to further improve the stability of the resulting coating, the composition of the present invention may also comprise complex inorganic pigments manufactured by high temperature calcinations of compounds with metal oxides mixture in an amount between 10 and 30 wt. %, preferably between 15 and 25 wt. %, and more preferably about 19 wt. %, based on the total weight of the resin component. The material of complex inorganic pigments has excellent heat stability (up to 1000° C.), good alkali and acid resistance, and excellent weathering and light fastness properties. Therefore, it may be used in the composition of the present invention to enhance the relevant properties. An example of the material of complex inorganic pigments is the black pigment which is commercially available under the name PN2061, is a complex inorganic pigments which manufactured by high temperature calcinations of metal oxides mixture. It has an excellent heat stability (up to 1000° C.), good alkali and acid resistance, and excellent weathering and light fastness properties.

It is important to ensure that any filler is dispersed homogeneously throughout the powder coating composition that composition may be prepared with and comprise a suitable dispersant. Herein it is preferred that the powder coating composition comprises between 0.5 and 2 wt. %, based on the total weight of all resin components in the powder coating composition, of a dispersant, said dispersant preferably comprising polyvinyl butyral.

Moreover, it is known that zinc particulates may be added to powder coating compositions to impart corrosion resistance to the underlying substrate. Herein it is preferred that the powder coating composition comprises from 1 to 50 wt. %, preferably between 20 and 30 wt. %, based on the total weight of all resin components in the powder coating composition, of at least one of zinc powder or zinc flakes.

In a preferred embodiment zinc dust is added to improve the micro crack resistance, in particular when the coating is exposed to temperatures above the melting point of zinc (419° C.).

The composition may comprise zinc salts, such as zinc octoate, zinc acetylacetonate or zinc neodecanoate, in a total amount from 0.1 wt. % to 2.0 wt. %, based on the total weight of all resin components in the powder coating composition. These salts—or alternatives such as dibutyl tin dilaurate and stannous octoate—catalyze the auto-condensation of the silicone resins thereby reducing the gel time thereof.

Flow control and leveling additives may be present in the powder coating compositions in an amount between 0.1 and 10 wt. %, preferably between 1 and 5 wt. %, and more preferably about 1.4 wt. %, based on the total weight of all resin components in the powder coating composition. Such flow control agents, which enhance the compositions melt-flow properties and assist in eliminating surface defects, typically include acrylics and fluorine based polymers. Examples of commercially available flow control agents include: Resiflow® P-67, Resiflow® P-200 and Clearflow® (all available from Estron Chemical Inc., Calvert City, Ky.); BYK® 361 and BYK® 300 from YK Chemie (Wallingford, Conn.); and, Mondaflow® 2000 from Monsanto (St. Louis, Mo.).

Degassing agents can also be used in the powder coating compositions of the present invention in an amount between 0.1 and 5 wt. %, preferably between 0.5 and 2 wt. %, and more preferably about 0.8 wt. %, based on the total weight of all resin components in the powder coating composition. Such degassing agents facilitate the release of gases during the curing process. Examples of commercially available degassing agents include: Benzoin available from Well Worth Medicines; and, Uraflow® B available from GCA Chemical Corporation (Brandenton, Fla.).

The powder coating compositions may also comprise a dry-flow additive in an amount from 0.05 to 1.0 wt. %, based on the total weight of the composition. Examples of such additives include fumed silica, aluminium oxide and mixtures thereof.

In addition to those components described above the powder coating compositions may comprise other conventional additives. These include: pigments; gloss-modifying additives; cratering agents; cure agents; texturizers; surfactants; biocides; and, organic plasticizers. Colorants or pigments useful in the powders of the present invention may include carbon black, such as 9875 Black available from Engelhard Corporation (Ohio), metal flakes, and heat resistant pigments, such as the various iron oxide pigments and mixed metal oxide pigments. The amount of colorant or pigment may range up to 20 parts per hundred resin by weight (phr), and preferably ranges from 0.1 to 15 phr, more preferably from 0.5 to 10 phr.

In another aspect of the present invention, a preparation method of the composition of high temperature resistant powder coating is provided. The powder coating compositions of the present invention, which are solid particulate film-forming mixtures, were prepared by conventional manufacturing techniques used in the powder coating industry. Typically, the above mentioned components of the powder coating composition were dry blended together, melt mixed in an extruder at a temperature sufficient to melt the multi-constituent resins (preferably at temperatures below 200° C.) and then extruded. The extrudate was then cooled to a solid, broken up and ground into a fine powder having a particle size of about 20 to about 60 microns.

Where dry-blending and extrusion could potentially damage certain components of a powder composition, or equally where certain abrasive components could damage blenders and extruders, it may be necessary to add such components to the formed fine powder.

In yet another aspect the present invention, use of the composition of high temperature resistant powder coating is provided. The powder coating compositions are most often applied by spraying, particularly electrostatic spraying, or by the use of a fluidized bed. The powder coating compositions can be applied in a single sweep or in several passes to provide a film of the desired thickness after cure. The powder coating compositions of this invention may be applied to a variety of substrates including metallic and non-metallic substrates.

Following their application to a given thickness, the coated substrate is typically heated to a temperature between 120° C. and 260° C. for a period of 1 to 60 minutes to melt the composition, causing it to flow but also to cure to form a cross-linked matrix that is bound to the substrate. Preferably the coated substrate is heated to a temperature between 200° C. and 250° C. for a period of 20 to 40 minutes. In an alternative to this process, the powder coating compositions may be at least partially melted and cured by application to a pre-heated substrate; depending on the degree of curing the powder may be further heated after application.

In still another aspect of the present invention, accordingly, a substrate coated with a cured layer of the composition of high temperature resistant powder coating is provided.

The advantages achieved by the compositions of the present invention are as follows:

1) The composition of the present invention is capable of forming a coating which has excellent performance in terms of heat resistance, brittleness, anti-cracking, and anti-peeling/flaking off the substrate, which makes the composition quite suitable for use in assemblies working under high temperature environment, such as automotive exhausting parts, barbecue grills, stove burner elements;

2) The composition of the present invention is friendly to the environment, since it is without organic solvents, and therefore non-hazardous and non-polluting;

3) The composition of the present invention is easy for both preparation and use, so it is convenient for the present invention to be applied in large scale production.

The present invention is further illustrated by, but not limited to, the following examples

EXAMPLES

Raw Materials

In the examples the raw materials listed in Table 1 were used.

TABLE 1

| Raw materials | |
|---|---|
| Silres-604 | A hydroxyl-functional methylphenyl polysiloxane resin sold by Wacker Chemie. This resin has a reactive hydroxyl content of between 3.5 and 7%, a T 9 in the range of 55 to BO° C., and a melt viscosity at 140° C. of 10.3 poise |
| DC233 | A methylphenyl silicone resin sold by Dow Corning. This resin has a reactive hydroxyl content of 6%, a Tg of 45° C. and a melt viscosity at 140° C. of 21.3 poise |
| Fine Clad ® A 241 | Acrylic resin having glycidyl and hydroxyl functionality and having an epoxide equivalent weight (EEW) of greater than 300 available from Reichold Inc. |
| Mica W1 | A muscovite containing mineral available from Norwegian Talc AS |
| Mica Suzorite 325HK | A phlogopite mica having a high aspect ratio, available from Imerys |
| Mica 1240 | A dry milled muscovite available from 20 Microns |
| GLP-588 | Leveling agent available from Ningo South Sea Chemical Co. Ltd. |
| Benzoin | Degassing agent available from Well Worth Medicines |
| Lanco TF-178O | PTFE-modified polyethylene, micronized wax available from 20 Lubrizol Advanced Materials, Inc. |
| Adhesion promotor T70 | A high molecular weight polymer having amine - reactive groups, available from Dongguan zhong tian Decorative Materials. |
| Coatforce CF10 | A synthetically engineered aluminium, magnesium and silicon mixed metal oxide provided by Lapinus Fibres |
| Wollastonite NYAD M325 | A calcium metasilicate additive or filler for powder coatings provided by Nyco Minerals |
| Zinc Metal FH800 | Powdered zinc metal available from Umicore |
| Tomatec 42-303B | Inorganic pigment available from Tokan Material Technology Co. Ltd. |
| P-1407 | Acid polyester hardener available from Twin Hill Paints P. Ltd (India) |
| Araldite ® GT-7004 | Solid, medium molecular weight Epoxy resin based on Bisphenol A available from Hunstman LLC |
| Resiflow ® P-67 | Flow control agent available from Estron Chemical Inc., Calvert City, KY |
| Primacor ® 5990 | Ethylene acrylic acid (EEA) copolymer available from Dow Chemicals |
| 9875 Black | Carbon black colourant available from Engelhard Corporation, Ohio |
| Zinc Dust | Superfine grade available from Transpek Silox Industry Ltd. |
| Standart ® AT | Zinc flakes available from Eckart Effect Pigments |
| Mowital B-30H | Polyvinyl butyral provided by Kuraray. |

Preparation of Powder Coating Compositions

Various powder coating compositions were prepared by blending the components listed in Table 2. Said blended material was then passed through a twin-screw extruder, which served to melt and further mix the materials. The extrudate was solidified by passing it between chilled rollers after which it fragmented into flakes. The flakes were then ground through a mill. The resulting powder was passed through an 80-mesh sieve to remove coarse particles.

The powder coating compositions of Table 2 were applied to S110 panels (Steel plate, cold rolled, blasted with 0.3 mm stainless steel balls) as a single coat using a corona gun to achieve a film thickness of between 70-100 µm. The applied powder coating composition was cured by heating the substrate to 230° C. and maintained at that temperature for 30 minutes.

TABLE 2

Composition of the powder coatings samples, in phr

|  | EX_1 | EX_2 | EX_3 | CE_1* | CE_2* |
|---|---|---|---|---|---|
| Silres-604 | 40.5 | 40.5 | 40.5 | 40.7 | 39.2 |
| DC233 | 40.5 | 40.5 | 40.5 | 40.7 | 39.2 |
| Fine Clad ® A 241 | 19.0 | 19.0 | 19.0 |  | 21.6 |
| Mica Suzorite 325HK | 64.3 |  | 64.3 |  |  |
| Mica W1 |  | 91.1 |  |  |  |
| Mica 1240 |  |  |  | 6.5 |  |
| GLP-588 | 1.4 |  | 1.4 |  |  |
| Benzoin | 0.8 | 0.8 | 0.8 | 0.7 | 2.7 |
| Lanco TF-1830 | 0.5 | 0.5 | 0.5 | 3.5 | 0.5 |
| Adhesion promotor T70 | 2.7 |  | 2.7 |  |  |
| Coatforce CF10 | 81.1 |  | 54.1 | 18.6 | 54.1 |
| Wollastonite NYAD M325 |  | 54.1 |  |  |  |
| Zinc Metal FH800 |  |  | 27.0 |  |  |
| Tomatec 42-303B | 19.0 | 19.0 | 19.0 |  |  |
| P-1407 |  |  |  | 13.0 |  |
| Araldite ® GT-7004 |  |  |  | 5.6 |  |
| Resiflow ® P-67 |  |  |  | 2.8 | 2.7 |
| 9875 Black |  |  |  | 11.6 | 13.5 |
| Zinc Dust |  |  |  | 79.1 | 85.1 |
| Standart ® AT |  |  |  | 7.0 | 8.1 |
| Mowital B-30H |  |  |  | 2.3 | 2.7 |
| Primacor ® 5990 |  |  |  |  | 0.8 |

*Comparative example

The coated samples were exposed to two different test protocols. The protocols were as follows:

Protocol 1 (Thermal Exposure)
A sample is heated in a furnace to 550° C. and kept at that temperature for 5 hours. After these 5 hours, the samples are removed from the furnace and are allowed to cool to room temperature at ambient conditions.

Protocol 2 (Thermal Cycles)
A samples is heated in a furnace to 550° C. and kept at that temperature for 1 hour and then quenched in cold water. This process is then repeated 9 more times (so 10 heating cycles in total.

The test protocols were done with different sets of samples. The crosshatch adhesion of the coatings was tested in accordance with the adhesion test method published by the American Society For Testing And Materials (ASTM) using the method 03359-02, "Standard Test Methods for Measuring Adhesion by Tape Test", Test Method B—Cross-Cut Tape Test (2002). This method provides for cutting through the film in a crosshatch pattern of specified spacing, and taping the cut area with Elcometer 99 tape, and then rapidly removing the tape. The cut area is then inspected to determine if paint has been loosened or removed, and the area is given a rating.

A rating of 5B is a perfect rating, requiring that none of the coating be removed.
A rating of 0B would indicate that 65% or more of the coating was removed, thereby showing poor adhesion of the coating to the substrate. The Minimum acceptable adhesion rating is 3B.

The results of the various tests is given in Table 3

TABLE 3

Test results

|  | EX_1 | EX_2 | EX_3 | CE_1 | CE_2 |
|---|---|---|---|---|---|
| Protocol 1 (Thermal Exposure) results | Pass | Pass | Pass | Fail | Fail |
| Crosshatch adhesion rating after protocol 1 testing | 4B | 3B | 5B | cracking and peeling off | cracking and peeling off |
| Protocol 2 (Thermal cycling) results | Pass | Pass | Pass | Fail | Fail |

These test results clearly show that powder coatings with a good resistance to high temperatures and high temperature cycling can be obtained by using a combination of two different silicone resins, a bi-functional resin, and a mica-containing filler.

What is claimed:

1. A powder coating composition comprising at least two silicone resins having at least one of different glass transition temperatures or different melt viscosities, a reinforcing filler, a bi-functional acrylic resin having hydroxyl and glycidyl functional groups, and a mica-containing filler, wherein the bi-functional acrylic resin is present in an amount of 15-25 wt. % based on the combined weight of the at least two silicone resins and the bi-functional resin and wherein the mica-containing filler is present in an amount of 45-100 wt. % based on the combined weight of the at least two silicone resins and the bi-functional resin.

2. The powder coating composition according to claim 1, wherein the at least two silicone resins comprise a first silicone resin and a second silicone resin which are present in a ratio by weight of between 2:1 and 1:2, and in a total amount of greater than 60 wt. %, and less than 100 wt. % based on the combined weight of the at least two silicone resins and the bi-functional resin.

3. The powder coating composition according to claim 2, wherein the first silicone resin has a $T_g$ in the range from 40° C. to 50° C., and the second silicone resin has a $T_g$ in the range from 55° C. to 80° C.

4. A method of coating a substrate, the method comprising: coating the substrate with the powder coating composition according to claim 3.

5. The powder coating composition according to claim 1, wherein the composition further comprises an adhesion promoter having groups selected from ethoxy active groups, carboxyl groups, anhydride groups, hydroxyl groups, halogen groups, cyano groups, amido or sulphonate groups.

6. The powder coating composition according to claim 5, wherein the adhesion promoter is a polymer with ethoxy active groups.

7. The powder coating composition according to claim 6, wherein the adhesion promoter is present in an amount between 0.1 and 5.0 wt. % based on the combined weight of the at least two silicone resins and the bi-functional resin.

8. The powder coating composition according to claim 5 or 6, wherein the adhesion promoter is present in an amount of 0.1 to 5.0 wt. % based on the combined weight of the at least two silicone resins and the bi-functional resin.

9. A method of coating a substrate, the method comprising: coating the substrate with the powder coating composition according to claim 8.

10. The powder coating composition according to claim 1, wherein the reinforcing filler has an elongated shape, with the ratio of one dimension of the reinforcing filler to another being within the range of 15-35.

11. The powder coating composition according to claim 10, wherein the ratio of one dimension of the reinforcing filler to another is within the range of 20-30.

12. The powder coating composition according to claim 11, wherein the reinforcing filler has a melting point of not less than 700° C.

13. The powder coating composition according to claim 11, wherein the reinforcing filler is a fiber or flake material which is selected from the group consisting of glass, metal, mineral, calcium metasilicate flakes, and a combination thereof.

14. A method of coating a substrate, the method comprising: coating the substrate with the powder coating composition according to claim 13.

15. A substrate coated with a cured layer of the composition according to claim 1.

16. A method of coating a substrate, the method comprising: coating the substrate with the powder coating composition according to claim 1.

* * * * *